Oct. 17, 1961 C. R. LOCKLIN 3,005,057

MULTIPLE DUPLICATING TAPE RECORDER

Filed May 15, 1957 3 Sheets-Sheet 1

INVENTOR.
Charles R. Locklin
Barthel & Bugbee
Attys

INVENTOR.
Charles R. Locklin
BY Barthel + Bugbee
Attys

Oct. 17, 1961 C. R. LOCKLIN 3,005,057

MULTIPLE DUPLICATING TAPE RECORDER

Filed May 15, 1957 3 Sheets-Sheet 3

INVENTOR.
Charle R. Locklin
BY Barthel + Bugbee
Attys

United States Patent Office 3,005,057

Patented Oct. 17, 1961

3,005,057
MULTIPLE DUPLICATING TAPE RECORDER

Charles R. Locklin, 2140 Lochaven Road, Pontiac, Mich.

Filed May 15, 1957, Ser. No. 659,387
9 Claims. (Cl. 179—100.2)

This invention relates to tape recorders and, in particular, to duplicating tape recorders.

One object of this invention is to provide a multiple duplicating tape recorder wherein many duplicate tapes can be recorded simultaneously from a previously-recorded master tape in a rapid and easily accomplished manner.

Another object is to provide a multiple duplicating tape recorder of the foregoing character wherein the tape supply reels and the tape receiving reels do not require mounting on axles but merely require dropping into troughs before recording is started, means being provided for frictionally retarding the free rotation of the tape supply reels and for facilitating the rotation of the tape receiving reels.

Another object is to provide a multiple duplicating tape recorder of the foregoing character wherein the receiving reels of all tapes, including the master tape being recorded, are simultaneously driven by a common driving device past the recording heads, with the result that all of the duplicating tapes are maintained simultaneously in synchronism with one another and with the master tape.

Another object is to provide a multiple duplicating tape recorder of the foregoing character wherein the master and duplicating tapes immediately adjacent their respective recording heads are engaged in common by an idler roll and a driving roll, one of which rolls is quickly and easily swingable upward out of the way when threading the tapes through the machine.

Another object is to provide a multiple duplicating tape recorder of the foregoing character wherein all of the tape-receiving reels are driven by a common driving roll which is likewise swingable out of the way while the tape-receiving reels are being dropped into their respective operating positions, means being also provided for disconnecting the drive to the driving roll before such swinging is carried out.

Another object is to provide a multiple duplicating tape recorder of the foregoing character wherein the driving roll is equipped with a slipping clutch which automatically tends to compensate for differences in the speed of the tape resulting from the increase in diameter of the wound tape as winding proceeds.

Another object is to provide a multiple duplicating tape recorder of the foregoing character wherein means is provided for mounting and driving master tapes at opposite sides of the machine, with duplicate tapes disposed in the space between the master tape, so that the same driving mechanism simultaneously handles the duplicating of two different sets of tapes.

Another object is to provide a multiple duplicating tape recorder of the foregoing character wherein a modified means is provided for mounting the tape supply reels in an approximately common plane on parallel individual spindles or pins, means also being provided to impart guidance of the tapes through a quarter turn each in order to bring them into the same plane at the driving roll or capstan roll.

Other objects and advantages of the invention will become apparent during the course of the following description of the accompanying drawings, wherein.

Figures 1, 8:
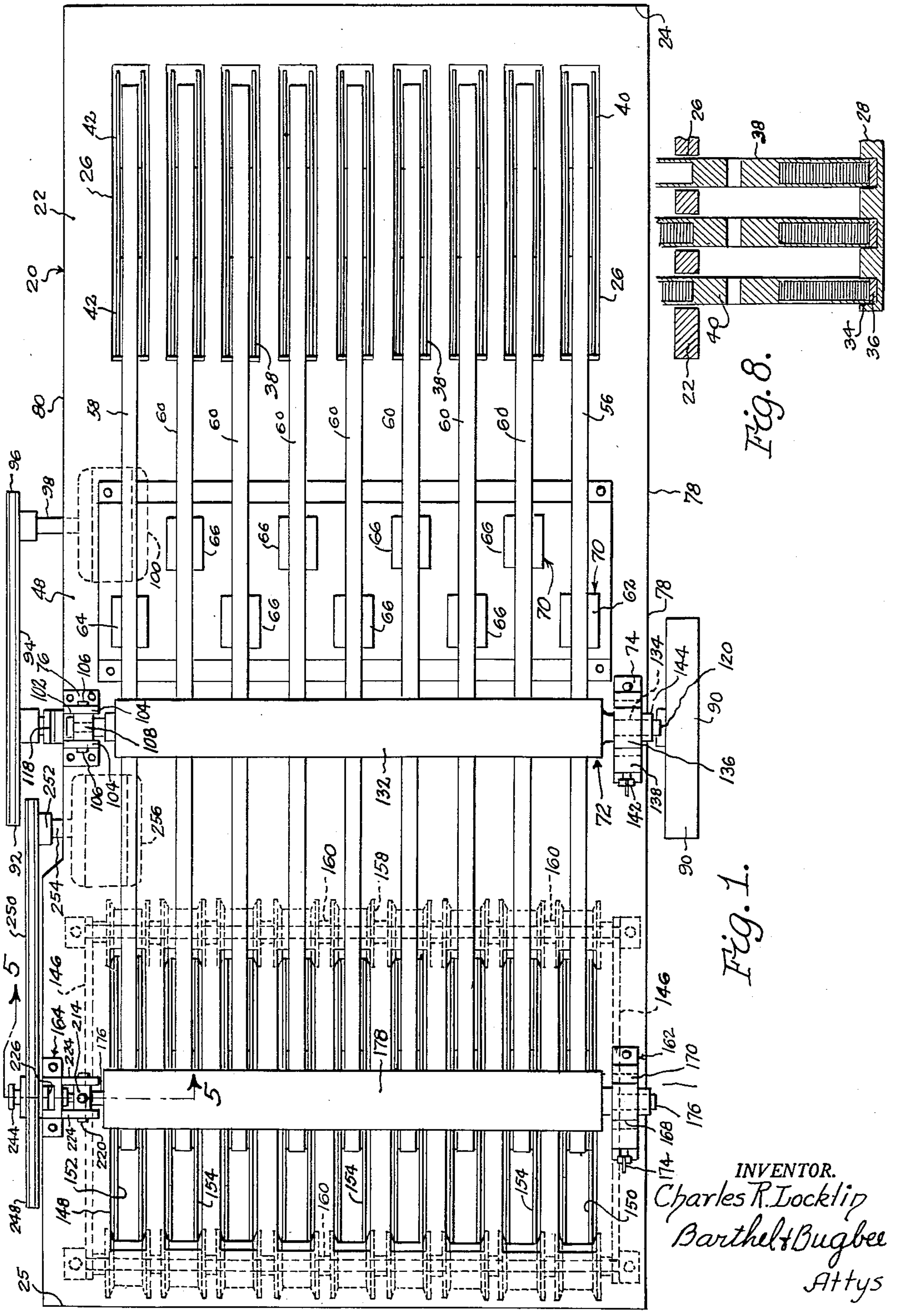
FIGURE 1 is a top plan view of a multiple duplicating tape recording, according to one form of the invention.
Figures 2, 5, 6, 7:
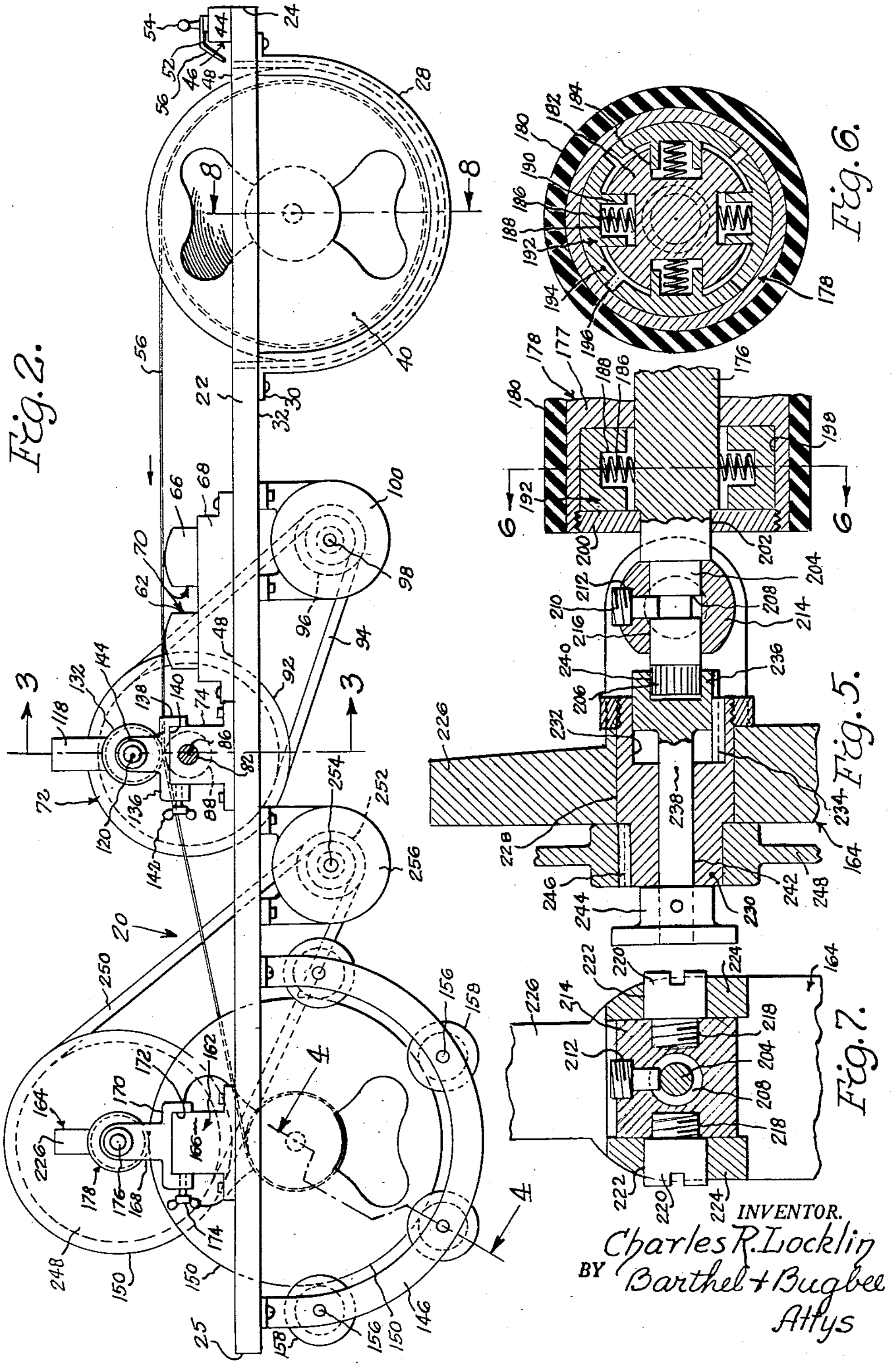
FIGURE 2 is a side elevation of the machine shown in FIGURE 1, omitting the machine-supporting legs or frame for simplicity of showing.
Figure 9:
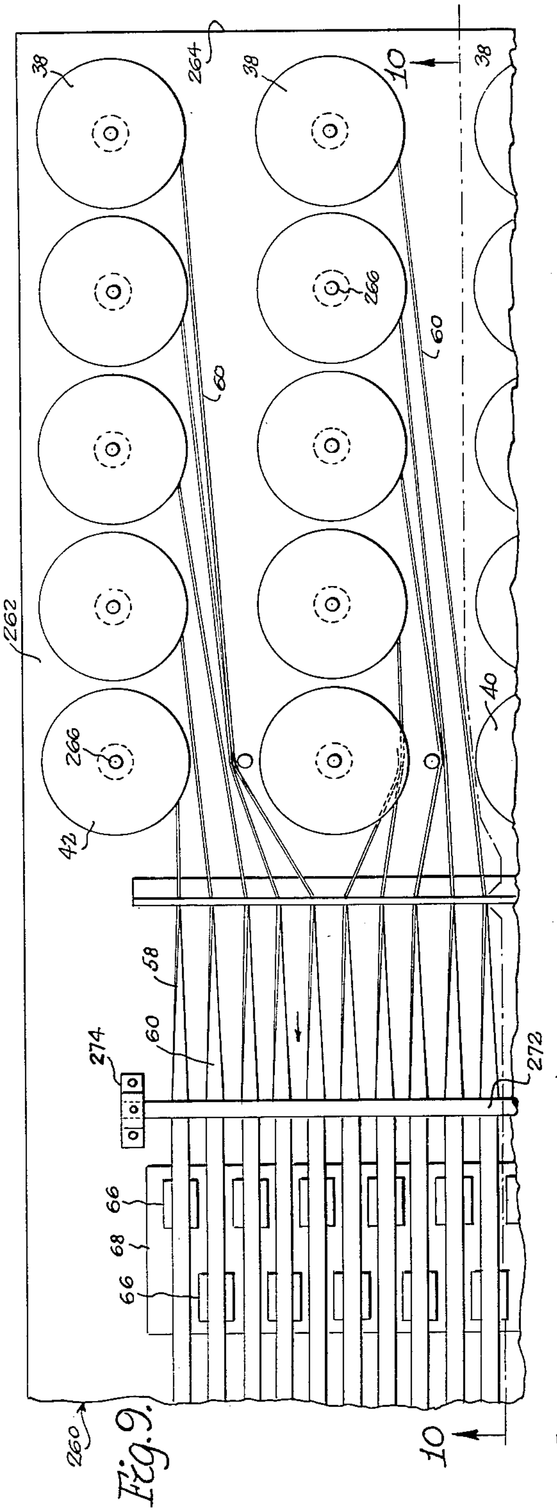
Figures 3, 4, 10:
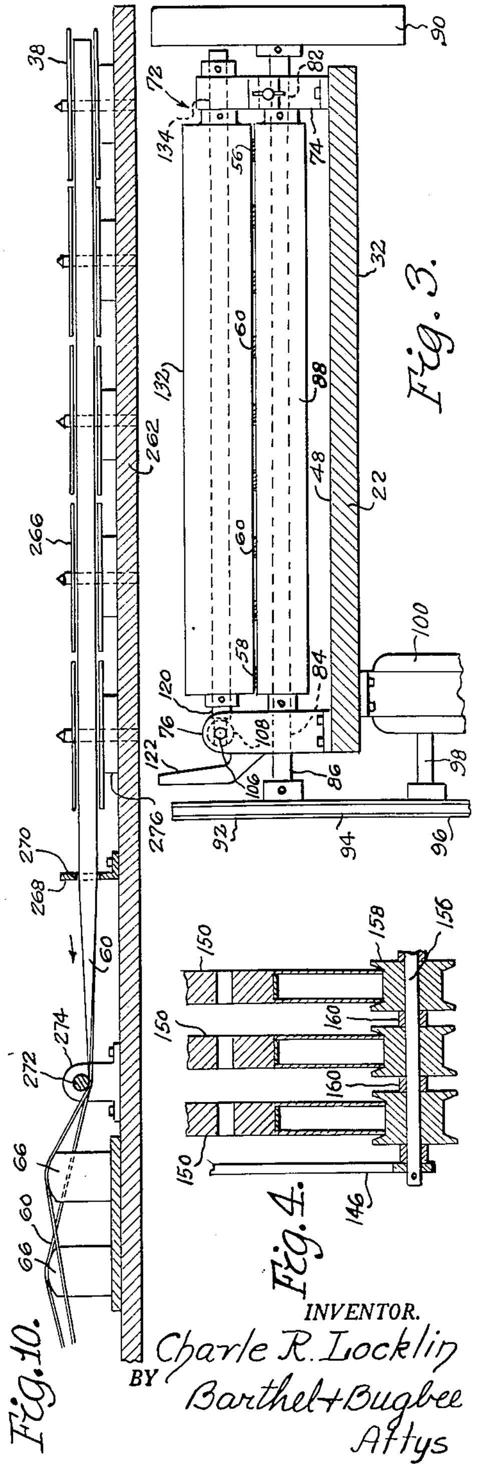

FIGURE 3 s a vertical cross-section taken along the line 3—3 in FIGURE 2, with the idler rolls shown in elevation;

FIGURE 4 is a fragmentary general vertical cross section taken along the line 4—4 in FIGURE 2 in a slightly inclined plane showing the means for rotatably supporting the tape receiving reels;

FIGURE 5 is an enlarged fragmentary vertical section taken along the line 5—5 in FIGURE 1, showing details of the sliding drive connection and friction clutch associated with the tape receiving reel driving roll;

FIGURE 6 is a cross-section taken along the line 6—6 in FIGURE 5, showing further details of the slipping friction clutch for the reel-driving roll;

FIGURE 7 is a cross-section taken along the line 7—7 in FIGURE 5, showing details of the roller shaft tilting arrangement;

FIGURE 8 is a fragmentary cross-section taken along the line 8—8 in FIGURE 2, showing the means for rotatably supporting and retarding the free rotation of the tape supply reels;

FIGURE 9 is a fragmentary top plan view of the tape supply reels slightly modified multiple duplicating tape recorder wherein the tape supply reels are mounted in a substantially common plane upon individual spindles; and FIGURE 10 is a vertical longitudinal section taken along the line 10—10 in FIGURE 9.

Referring to the drawings in detail, FIGURES 1 to 8, inclusive, show a multiple duplicating tape recorder, generally designated 20, mounted on a base plate or bed plate 22 which in turn is supported by any suitable legs, frame or other means (not shown), such supporting means having been omitted from the drawings to simplify the showing and to avoid covering up some of the essential mechanism. The bed plate 22 has right-hand and left-hand ends 24 and 25 respectively and its right-hand end 24 is provided wtih laterally-spaced parallel multiple slots 26 (FIGURES 1 and 8) below which is mounted a tape-supply reel trough member 28 of approximately semi-cylindrical form having flanges 30 at its upper edges bolted or otherwise secured to the underside 32 of the bed plate 22. Also mounted in laterally-spaced parallel arcuate grooves 34 in the trough member 28 (FIGURE 8) are arcuate friction strips 36 of felt or other suitable material which serve simultaneously the purposes of providing cushioned supports for the tape supply reels 38 and master tape reels 40 and 42 and of frictionally retarding the free rotation thereof. The grooves 34 are, of course, placed immediately below the slots 26 so as to be aligned therewith.

The reels 38, 40 and 42 are of conventional construction and their details are beyond the scope of the present invention. The master reels 40 and 42 are wound with master tapes 56 and 58 each bearing a recording to be duplicated upon the duplicate tapes 60 on the reels 38 between them.

The master tapes 56 and 58 and the duplicate tapes 60 pass respectively over master sound-reproducing heads 62 and 64 and duplicating sound recording heads 66, one such head being provided for its respective tape and all of the heads being mounted upon a head supporting casing 68 bolted or otherwise suitably secured to the upper surface 48 of the machine bed plate 22 in a direction transversely thereof. The master sound reproducing heads 62 and 64 and the duplicating sound recording heads 66 and the electronic circuit interconnecting them are conventional and well-known in the electronics and sound-recording art and their details are beyond the scope of the present invention. It will be understood that the above-mentioned conventional electronic circuit interconnecting the sound reproducing and recording heads 62, 64 and 66 includes conventional selection switch means (not shown) for selectively connecting either of the master sound reproducing heads 62 or 64 to any of the duplicating sound recording heads 66.

Bolted or otherwise secured to the bed plate 22, immediately to the left of the recording head assembly, generally designated 70, is a tape driving unit, generally designated 72, (FIGURES 1, 2 and 3). The tape driving unit 72 (FIGURES 1 and 3) includes a pair of laterally-spaced upstanding bearing blocks or pedestals 74 and 76 respectively located near the opposite longitudinal edges 78 and 80 of the bed plate 22. The bearing blocks 74 and 76 are bolted or otherwise secured at their lower ends to the upper surface 48 of the bed plate 22 and in their lower portions are provided with bearing bores 82 and 84 which rotatably support the opposite ends of a tape-driving roll shaft 86 upon which a tape driving roll or capstan roll 88 is drivingly mounted. The capstan roll 88 is preferably made of polished metal. Pinned or otherwise drivingly connected to the forward and rearward ends of the shaft 86 are a flywheel 90 and a driven pulley 92 respectively. The driven pulley 92, which is preferably a V-grooved pulley, receives a drive belt 94, such as a conventional V-belt, which is driven in turn from a drive pulley 96 drivingly connected to the output shaft 98 of a motor 100, such as a conventional electric motor, which is bolted or otherwise drivingly secured to the underside 32 of the bed plate 22 and depends therefrom.

The upper end of the bearing block 76 is slotted as at 102 (FIGURE 1) to provide spaced upstanding ears 104 which are bored horizontally in alignment to pivotally receive the trunnion screws 106 threaded onto the opposite sides of a trunnion block 108. The trunnion block 108 is bored perpendicularly to the axis of the trunnion screws 106 to rotatably receive the rearward end of the upper or idler roll shaft 120. The upper end of the bearing block 76 has an upstanding stop lug 118 thereon.

Pinned or otherwise drivingly connected to the idler roll shaft 120 is an idler or pressure roll 132 (FIGURE 3), the forward end of the shaft 120 being journaled in a bearing bore 134 in a swing block 136 (FIGURE 2). The latter consists of a base portion 138 having a bottom notch or groove 140 adapted to fit snugly downward over the top of the bearing block 74 and releasably secured thereto by a thumb screw 142 threaded through the base portion 138 into the notch 140. The swing block 136 is retained in position on the shaft 120 against the outer or forward end of the idler roll 132 by a collar 144 (FIGURES 1 and 3) pinned or otherwise secured to the shaft 120. The rollers 132 like the roller 88 is preferably of natural or synthetic rubber or synthetic plastic and their peripheries are spaced sufficiently close to one another (FIGURE 3) to frictionally and drivingly engage the master tapes 56 and 58 and duplicate tapes 60 threaded therebetween, as explained below in connection with the operation of the invention.

Bolted or otherwise secured to the underside 32 of the bed plate 22 near the left-hand end 25 thereof are laterally-spaced semi-circular brackets 146 disposed near the opposite edges 78 and 80 respectively of the bed plate 22. The latter is also provided with laterally-spaced elongated slots 148 similar to the slots 26 previously mentioned and aligned therewith. The slots 148, like the slots 26, have widths and lengths sufficiently large to freely receive conventional empty recording tape reels, in particular the outwardly-located empty master tape receiving reels 150 and 152 of the master tapes 56 and 58, and the empty intermediate recorded tape receiving reels 154. The arcuate or semi-circular brackets 146 are drilled at aligned circumferentially-spaced locations to receive circumferentially-spaced shafts 156 on which flanged reel-supporting spools or grooved wheels 158 are rotatably mounted in vertical alignment with the slot 148, spacing collars 160 (FIGURE 4) being provided for maintaining the spools 158 in proper alignment with their respective slots 148.

Mounted in the bed plate 22 and bolted or otherwise secured to the upper surface 48 thereof immediately above the centers of the semi-circular brackets 146 are laterally-spaced upstanding bearing blocks or pedestals 162 and 164 respectively located near the opposite edges 78 and 80 of the bed plate 22. The bearing pedestal 162 closely resembles the bearing pedestal 74 (FIGURE 2) and like the latter has a lower part 166 which is detachably engaged by an upper part or swing block 168 having a base portion 170 containing a groove or notch 172 fitting over the top of the lower portion 166 and detachably locked thereto by a thumb screw 174 threaded through the base portion 170. Journaled in the upper part 168 is a driving roll shaft 176 (FIGURES 1 and 2) upon which the cylindrical core 177 of a driving roll 178 is loosely mounted for yielding relative rotation and covered with a hollow cylindrical layer 180 (FIGURE 5) of rubber, synthetic rubber or synthetic plastic. The opposite end of the shaft 176 is provided with a generally circular integral flange 182 (FIGURE 6) provided with four circumferentially spaced parallel-sided notches 184, the bottoms of which form abutments for the inner ends of compression springs 186. The outer ends of the compression springs 186 engage bored sockets 188 in the radial stems 190 of friction shoes 192 having arcuate friction portions 194 frictionally engageable with the internal cylindrical surface 196 of a counterbore 198 in the end of the roll 178. The counterbore 196 is threaded at its mouth to receive a closure disc 200 (FIGURE 5) which retains the shoes 192 within the counterbore 196.

The roll shaft 176 passes through a hole 202 in the closure disc 200 and has a reduced diameter portion 204 terminating in a splined end 206 and having an intermediate annular groove 208. The latter is engaged by the inner end of a retaining screw 210 threaded into a hole 212 in a trunnion block 214 having a bore 216 rotatably receiving the reduced diameter portion 204 of the roll shaft 176. The trunnion block 214 is bored and threaded as at 218 in alignment on its opposite sides to receive the threaded shanks of pivot screws 220 (FIGURE 7). The cylindrical heads of the pivot screws 220 pivotally engage aligned bores 222 in parallel ears 224 extending horizontally from the pedestal 164. The pedestal 164 at its upper end has an upstanding stop lug 226. The latter contains a bearing bore 228 (FIGURE 5) coaxial with the roll shaft 176 and rotatably receiving a stub shaft or hub 230 having a socket 232 in the end thereof nearest the trunnion block 214. Slidably received within the socket 232 of the stub shaft 230 and keyed thereto at 234 is the head 236 of the clutch rod 238, the clutch rod head 236 containing an internally splined socket 240 fitting and drivingly engaging the externally-splined portion 206 of the reduced diameter end portion 204 of the roll shaft 176.

In order to shift the clutch head 236 into and out of driving engagement with the splined portion 206 of the shaft 176, the clutch rod 238 is slidably mounted in a bore 242 in the stub shaft 230 and has a thumb knob 244 pinned or otherwise secured to its outer end. Keyed or otherwise drivingly secured as at 246 to the stub shaft 230 is a pulley 248, adapted to receive a belt 250. The pulley 248 is preferably of the V-grooved type adapted to receive the belt 250 which would thus be a V-belt. The belt 250 in turn is driven by a correspondingly-shaped drive pulley 252 keyed or otherwise drivingly secured to the output shaft 254 of an electric motor 256.

In the operation of the multiple duplicating tape recorder 20, either a single master reel 40 or two master reels 40 and 42 with their respective master tapes 56 and 58 to be duplicated are dropped through the slots 26 in the bed plate 22 (FIGURE 1) into their respective arcuate grooves 34 (FIGURE 8) resting upon the arcuate strips of felt 36 therein. Spools 38 containing tapes 60 to receive the recordings are similarly dropped through the slots 26 between the two outermost slots containing the master reels 40 and 42. The operator, by means of the thumb knob 244 (FIGURES 1 and 5) pulls the clutch rod 238 outward so as to disengage the internal and external splines 240 and 206 from one another, leaving the driving roll 178 free to be swung upward. The thumb screws 142 and 174 (FIGURE 2) blocking the upper portions of the bearing blocks or pedestals 74 and 162 to one another are then loosened, whereupon the rolls 132 and 178 are swung upward out of the way to the rear of the machine. The operator then secures the free end of each tape 56, 58 or 60 to the hub of an empty tape-receiving reel 150, 152 or 154, dropping the empty reels, thus connected to their respective tapes, through the slots 148 downward into engagement with their respective spools or grooved wheels 158 on the shafts 156. As now arranged, the tapes 56, 58 and 60 pass over their respective recording heads 62, 64 and 66 above the driving roll 88 to their respective reels 150, 152 or 154. The operator now swings the rolls 132 and 178 downward to their horizontal positions into interlocking engagement with lower portions of their respective pedestals 74 and 162, tightening the thumb screws 142 and 174 to lock them in place (FIGURES 1 and 2).

The operator now energizes the conventional electronic sound reproducing and recording circuit (not shown) and sets the selection switch means thereof at the proper position so as to properly proportion the number of duplicate tapes to be recorded from the master reels 40 and 42 respectively. He then shifts the clutch rod 238 inward by means of the thumb knob 244 (FIGURE 5), so as to drivingly interengage the splines 240 and 206. He now energizes the electric motors 100 and 256, the consequent rotation of their pulleys and belts rotating the driving rolls 88 and 178 to feed the tapes 56, 58 and 60 simultaneously over the recording heads 62, 64 and 66, between the rolls 88 and 132 and onto the empty reels 150, 152 and 154. The latter are of course driven by the frictional engagement of the roll 178 with their respective rims. As winding of the tapes 56, 58 and 60 proceeds in this manner, the tapes will always remain exactly in synchronism and the sound recorded on the master tapes 56 and 58 will be accurately duplicated on the duplicate tapes 60. Moreover, the machine 20 is operated rapidly and easily because of the ease and rapidity with which the reels are dropped into and out of their respective slots, without the need for threading them upon axles or mounting them in synchronism in separate duplicating sheets, as heretofore.

The modified multiple duplicating tape recorder, generally designated 260, shown in FIGURES 9 and 10 differs from the duplicating machine 20 only at its right-hand end, the selection of the machine to the left of the duplicating heads 62 (not shown), 64 and 66 being identical with that of the machine 20. Accordingly, only the rearward right-hand corner of the machine 260 is shown, as it is unnecessary to repeat the showing of portions thereof identical with the machine 20.

In particular, the modified duplicating machine 260 differs from the duplicating machine 220 in the mounting of the master reels 40 and 42 and the supply reels 38 with their respective master tapes 56 and 58 and duplicate tapes 60. (The master tape 56 on the master reel 40 is not shown in FIGURE 9 as it falls outside the range of the figure.) In the modified duplicating machine 260, the bed plate 262 correspondingly to the bed plate 22 of FIGURE 1 is provided near its right-hand end 264 with multiple rows of longitudinally-spaced pins or spindles 266, these rows being arranged substantially parallel to one another for convenience although it is obvious from FIGURE 9 that the pins 266 might equally well be located in zigzag lines in staggered relationship. The reels 40, 42 and 38 thus lie in horizontal positions preferably near a substantially common plane and their respective tapes 56 (not shown) 58 and 60 fan out from their respective reels toward a vertically-slotted horizontal guide bar 268, the parallel vertical guide slots 270 of which are spaced apart from one another laterally at such distances as will cause the tapes to pass properly over their respective recording heads 62, 64 and 66.

Because of the fact that the tapes pass over the recording heads 62, 64 and 66 in a horizontal plane but occupy vertical planes on their respective supply reels 38, 40 and 42, it is necessary for each of the tapes to execute a quarter turn from their respective reels to their respective recording heads. This quarter turn is brought about by the cooperation between the vertically-slotted guide bar 268, whicn is bolted or otherwise secured to the bed plate 262, and a longitudinally-spaced transverse guide rod 272 which is mounted in brackets 274 (only one of which is shown in FIGURE 9) bolted or otherwise secured to the bed plate 262. In order to raise the reels 38, 40 and 42 above the bed plate 262 (FIGURE 10) spacer discs 276 are preferably mounted on each pin or spindle 266 beneath its respective reel. These discs 276 are preferably made from felt or other frictional material so that they frictionally engage their respective reels 38, 40 or 42, and consequently exert a frictional drag or retarding effect thereon.

The operation of the modified multiple duplicating tape recorder 260 of FIGURES 9 and 10 closely resembles that of the tape recorder 20 except for the initial mounting of the master supply reels 40 and 42 and duplicate supply reels 38, and the initial threading of their respective tapes 56, 58 and 60. In the machine 260, the master reels 40 and 42 are dropped on the outermost spindles or pins 266 nearest the guide bar 268 and their tapes 56 and 58 threaded through the outermost vertical slots 270 therein, thence under the guide rod 272 (FIGURE 10) and over their respective recording heads 62 and 64, thence between the idler roll 132 and the driving roll 88 as in FIGURES 1 to 8 inclusive and so forth, as described above in connection with the operation of the duplicate recorder 20. In a similar manner, the duplicate tape supply reels 38 are mounted on the remaining pins or spindles 266 and threaded through the remaining vertical guide slots 270 in the guide bar 268, underneath the guide rod 272 and over their respective recording heads 66 and so on in similar parallel paths to those described above for the master tapes 56 and 58. After leaving each reel 38, 40 or 42, its respective tape proceeds in a vertical plane to its respective vertical guide slot 270, after which it executes a quarter turn before passing beneath the guide rod 272. The remainder of the operation of the duplicate tape recorder 260 is otherwise substantially the same as that described above in connection with the operation of the machine 20 of FIGURES 1 to 8 inclusive and is believed to require no repetition.

What I claim is:

1. A multiple duplicating tape recorder for reproducing the sound track of a master tape from a master reel upon a multiplicity of duplicate tapes respectively wound from duplicate tape supply reels onto empty tape-receiving reels, said recorder comprising a supporting structure, a tape supply reel carrier on said supporting structure constructed and arranged to rotatably carry the master tape supply reel and the duplicate tape supply reels, an empty tape-receiving reel holder on said supporting structure spaced apart from said tape supply reel carrier and constructed and arranged to rotatably hold a multiplicity of empty tape receiving reels and an empty master tape-receiving reel, means on said supporting structure for directing the tapes into laterally-spaced parallel paths during at least a part of their travel from the master and duplicate reels to the empty reels, a master sound-reproducing head and duplicating sound-recording heads disposed adjacent said master and duplicate tapes and adapted to be interconnected in a conventional sound-recording system, a rotary capstan device simultaneously drivingly engaging said master and duplicate tapes in synchronized tape-propelling relationship, means yieldingly and simultaneously engaging and urging said tapes into simultaneous propelled engagement with said capstan device, an empty-reel-rotating instrumentality including an elongated empty reel driving roll simultaneously rotatably engageable with the rims of the empty reels in said holder, and power-operated driving mechanism drivingly connected to said capstan device and reel-rotating instrumentality.

2. A multiple duplicating tape recorder, according to claim 1, wherein the empty reels driving roll is swingably mounted for swinging motion toward and away from the empty reels in the reel holder whereby to facilitate loading and unloading thereof.

3. A multiple duplicating tape recorder, according to claim 1, wherein the empty reels driving mechanism includes a slipping clutch interposed in the drive of said driving roll.

4. A multiple duplicating tape recorder, according to claim 1, wherein the empty reels driving mechanism includes a selectively engageable and releasable power-transmitting connector adapted to be disengaged prior to shifting of said driving roll away from said empty reels.

5. A multiple duplicating tape recorder, according to claim 4, wherein the empty reels driving mechanism also includes a slipping clutch interposed between said connector and said empty reel driving roll.

6. A multiple duplicating tape recorder, according to claim 1, wherein the empty reel holder includes a set of rotary empty-tape-receiving reel-supporting elements disposed in an arcuate path in engagement with the rim of each empty reel and wherein the empty reel driving roll engages the rim portion of each empty reel opposite the rim portion thereof engaged by said rotary reel-supporting element.

7. A multiple duplicating tape recorder, according to claim 1, wherein the reel carrier includes a multiplicity of spaced parallel reel-supporting spindles disposed on said supporting structure.

8. A multiple duplicating tape recorder, according to claim 7, wherein the taper-directing means includes a tape guiding contrivance having laterally-spaced tape guides disposed thereon.

9. A multiple duplicating tape recorder for reproducing the sound track of a master tape from a master reel upon a multiplicity of duplicate tapes wound from duplicate tape supply reels onto empty tape-receiving reels, said recorder comprising a supporting structure, a tape supply reel carrier on said supporting structure constructed and arranged to rotatably carry the master tape supply reel and the duplicate tape supply reels, an empty tape-receiving reel holder on said supporting structure spaced apart from said tape supply reel carrier and constructed and arranged to rotatably hold a multiplicity of empty tape-receiving reels and an empty master tape-receiving reel, means on said supporting structure for directing the tapes into laterally-spaced parallel paths during at least a part of their travel from the master and duplicate reels to the empty reels, a master sound-reproducing head and duplicating sound-recording heads disposed adjacent said master and duplicate tapes respectively and adapted to be interconnected in a conventional sound-recording system, a rotary capstan device simultaneously drivingly engaging said master and duplicate tapes in synchronized tape-propelling relationship, means yieldingly and simultaneously engaging and urging said tapes into simultaneous propelled engagement with said capstan device, an empty-reel-rotating instrumentality rotatably engageable with the rims of the empty reels in said holder, and power-operated driving mechanism drivingly connected to said capstan device and reel-rotating instrumentality, said empty reel driving mechanism including a slipping clutch interposed in the drive of the empty reel rims by said empty-reel-rotating instrumentality.

References Cited in the file of this patent

UNITED STATES PATENTS

| | | |
|---|---|---|
| 425,011 | Talbert | Apr. 8, 1890 |
| 1,811,817 | Stille | June 23, 1931 |
| 2,091,525 | Runge | Aug. 31, 1937 |
| 2,431,130 | Luchansky | Nov. 18, 1947 |
| 2,467,554 | Hornbostel et al. | Apr. 19, 1949 |
| 2,609,457 | Thurm | Sept. 2, 1952 |
| 2,624,214 | Arensberg | Jan. 6, 1953 |
| 2,698,359 | Roberts | Dec. 28, 1954 |
| 2,755,029 | Speed et al. | July 17, 1956 |
| 2,793,253 | Howey | May 21, 1957 |

FOREIGN PATENTS

| | | |
|---|---|---|
| 723,137 | Great Britain | Feb. 2, 1955 |